Nov. 4, 1958 W. STAEGE ET AL 2,858,822
DEVICE FOR INFLUENCING ENGINE FUEL DELIVERY BY TWO MUTUALLY INDEPENDENT OPERATING CONDITIONS
Filed Dec. 18, 1956
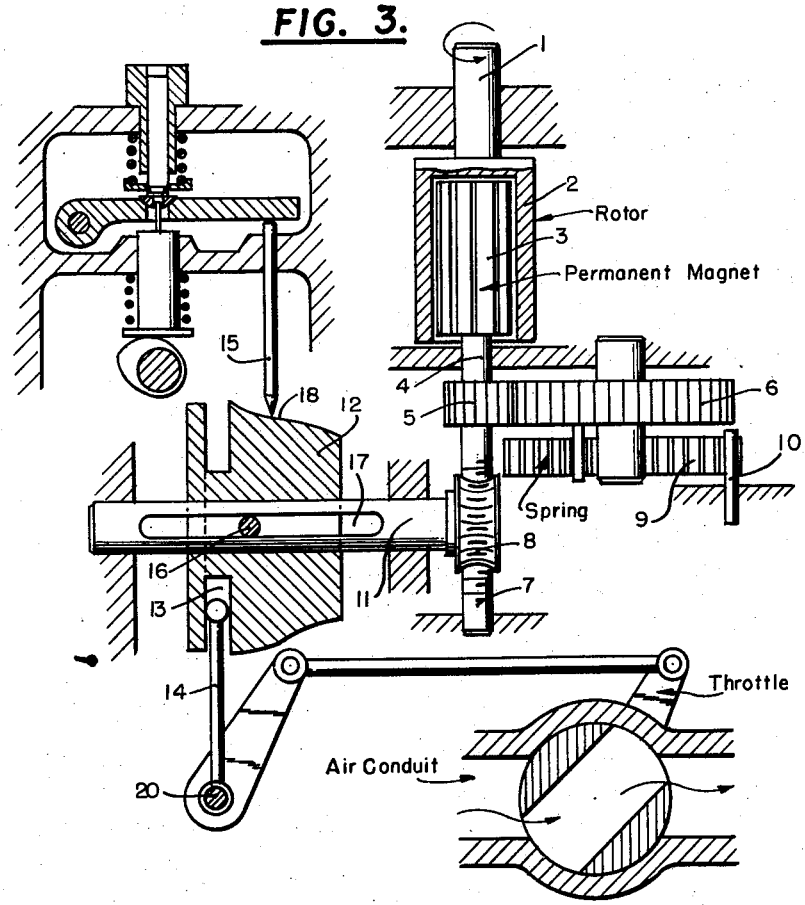
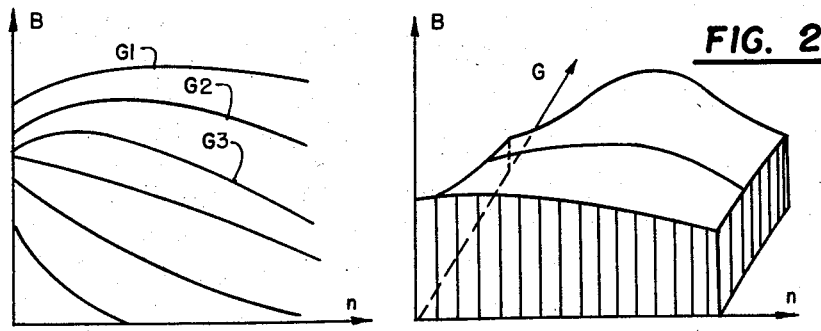
INVENTORS
Werner Staege
Otto Harr
BY
ATTORNEYS

2,858,822

DEVICE FOR INFLUENCING ENGINE FUEL DELIVERY BY TWO MUTUALLY INDEPENDENT OPERATING CONDITIONS

Werner Staege, Freudenstadt, Wurttemberg, and Otto Harr, Stuttgart-Moehringen, Germany Application December 18, 1956, Serial No. 629,087

7 Claims. (Cl. 123—140)

The present invention relates to solving the problem of influencing a condition or variable of state in dependence on two other mutually independent conditions or variables of state, preferably in accordance with an empirically established rule or law.

According to the present invention, the adjusting member for the condition being influenced is adapted to cooperate with a three-dimensional surface whose shape is derived from the said established rule or law, the said three-dimensional surface being plotted over a cylindrical surface and constituting the generated surface of a control disc which, while being mounted for rotation together with a shaft, is adapted to be axially shifted longitudinally of the said shaft, the arrangement being such that the angular position of said shaft are determined by an equilibrium or balance existing between a torque depending on one of the two influencing conditions and the force exerted by an energy-storing device which opposes the said torque, whereas the axial position of the said control disc is at any given moment determined by the position of a control disc displacing member which is adapted to be adjusted by changes in the other of the two controlling conditions.

The control system of the invention is of particular utility in regard to the control of the fuel delivery of a fuel injection pump supplying an internal combustion engine, the fuel delivery having to be controlled as a function of the speed of the engine as well as of its air consumption. The optimum relation between these three variables can be determined empirically. Given the positions, for each set of operating conditions of the engine, of the adjusting members associated with the respective variables, it is possible to establish the shape of the control surface of the control disc cooperating with the fuel injection pump adjusting member. Preferably the said control surface of the control disc is adapted to cooperate with a rod member adapted to adjust the length of stroke of the fuel pump, the engine to be thus controlled having a magnetic clutch adapted to impress on the control shaft a torque which is a function of the engine speed, and the admission butterfly valve of the engine being connected with a lever which is so arranged as to displace the control disc in an appropriate manner.

Further objects, features and advantages of the present invention will be readily apparent from the following detailed description of a preferred embodiment thereof taken in conjunction with the accompanying drawings illustrating a system for controlling the operation of an internal combustion engine by controlling the rate of delivery B of a fuel pump as a function of the engine speed $n$ and the air consumption G of the engine. In the drawings:

Figs. 1 and 2 are illustrations of the function $$B = f(G, n)$$

and

Fig. 3 is a diagrammatic representation of the control system of the invention.

It is assumed that the law $B = f(G, n)$ has been determined empirically and that this law, using as a parameter the quantity G (air consumption), is given in the form shown in Fig. 1. It is further assumed that the changes in the quantity B (quantity of fuel delivered by the fuel pump per pump stroke) are given as a function of the movement of, say, a control rod along a given path, the said changes being preferably directly proportional to the said movement. Under this assumption it is also possible to represent the function $B = f(G, n)$ as a three-dimensional surface in a system of three-dimensional coordinates having the axes B, G and $n$ as shown in Fig. 2.

The control device of the invention is so arranged that at a control shaft there is available a torque M which is a function of the speed of the engine, so that $M = f(n)$, and that any change in this torque M causes a rotation or angular movement of the said control shaft. For this purpose, the engine to be controlled is arranged in a per se known manner to drive a short-circuited rotor 2 via a shaft 1. Thus the short-circuited rotor 2 will rotate at the same speed as the engine, or, if a gearing is arranged between the rotor and engine shaft, there will be a constant ratio between the rotor speed and the engine speed. The rotor 2 influences a permanently magnetic armature 3 mounted on a shaft 4. Thus, the higher the speed of the short-circuited rotor 2, the higher will be the torque which the rotor can transmit to the permanent magnet and hence to the shaft 4. The shaft 4 of the permanent magnet 3 carries a pinion 5 which is in mesh with a gear wheel 6. One end of the shaft carrying the gear wheel 6 is engaged by a spiral spring 9 the other end of which is fixedly secured at 10 to a stationary member, for example to the housing of the control device. The magnetic coupling effected by the rotor 2 and the permanent magnet 3 impresses a torque on the shaft 4, this torque tending to rotate the shaft 4 until the spring 9 which opposes the said torque is tensioned to such a degree that the force set up in the spring counterbalances the torque, the result being that the shaft 4 comes to a standstill. Thus, any change in engine speed will produce a rotation of the shaft 4 through an angle which corresponds to and is a function of the change in engine speed. In this manner the condition $M = f(n)$ is met.

In addition to the pinion 5, the shaft 4 carries a worm 7 which is in engagement with a worm wheel 8 mounted on a shaft 11. The shaft 11 carries a control disc or cam member 12 which, while rotating together with the shaft, is axially displaceable in relation thereto. In the embodiment here described, the control disc carries a pin 16 fixedly secured thereto and engaging in a groove or slot 17 extending parallel to the axis of the shaft 11. In addition the control disc has an annular groove 13 formed therein which is engaged by one end of a lever 14 which is pivotally mounted at 20 so that any angular movement of said lever will cause the control disc to be displaced axially of the shaft 11. The angular position of the lever 14 and hence the axial position of the control disc 12 relative to the shaft 11 depends on the position of the butterfly valve controlling the admission line of the engine to be controlled.

The control surface of the cam member 12 as indicated at 18 is produced by plotting the three-dimensional surface of Fig. 2 against a cylindrical surface rather than against the plane G, $n$. Cooperating with the control surface 18 of the control disc or cam 12 is a rod 15 which is guided for radial movement in relation to the cam. The movements of the rod 15 control the rate of delivery B of the fuel pump in such a manner that the delivery B is reduced upon the rod 15 moving outwardly. The rod 15 may be associated with any suitable mechanism adapted to vary the delivery of the fuel pump. It is, however, preferred to have the rod 15 adjust the length of stroke of the fuel pump.

It will be appreciated that any change in the speed $n$ of the engine will cause the control cam 12 to be rotated in one of the two possible directions. In the event the position of the butterfly valve and hence the position of the lever 14 connected with the butterfly valve remains unchanged, the control cam 12 will not be displaced in an axial direction, and the delivery of the fuel pump will be exclusively controlled by the slope of that circumferential line of the control surface 13 which is in contact with the rod 15. However, upon the position of the butterfly valve being changed, the control cam 12 will be displaced axially of the shaft 11; this causing the delivery of the fuel pump to be changed in accordance with the slope of the longitudinal line on the control surface which is in contact with the rod 15. Thus, the delivery B of the pump is controlled as a function of both the speed of the engine and the position of the throttling member and hence the rate of air consumption, the control action being effected in accordance with empirically determined desired values.

The worm and wheel drive 7, 8 is preferably of the self-locking type so as to preclude any undesirable action of the control elements 12, 14 and 15 on the pinion shaft 4.

While a certain specific embodiment of the invention has been used herein for illustrative purposes, many variations with the scope of the invention will be recognized by those skilled in the art. Hence, the claims should be interpreted to include such variations excepting as they, by their own terms, expressly provide otherwise.

We claim:

1. A device for influencing the delivery rate of the fuel injection pump of an internal combustion engine as a function of the revolving speed of the engine and of the position of the throttle valve, comprising a cam member the surface of which is shaped in conformity with the technical law found empirically to assure the best operating conditions of said engine in dependence of said function, said cam member being axially mounted on a rotatable shaft so as to follow the rotating movements of said shaft but being free for reciprocation thereon, first means for controlling the angular position of said shaft, said first means including a rotor rotated with a speed proportional to the revolving speed of said internal combustion engine, an armature magnetically coupled to said rotor, energy-storing means connected to said armature, and means responsive to an equilibrium between the torque magnetically imparted to said armature by said rotor and the force exerted by said energy-storing means in opposition to said torque, second means for controlling the axial position of said cam member on said shaft, said second means including a lever following the movements of said throttle valve, said lever having a free end engaging a circumferential groove of said cam member, and transmission means for influencing the rate of delivery of said fuel injection pump in accordance with the position of said cam member.

2. The combination of claim 1 wherein said armature is mounted on a second shaft arranged perpendicularly to said first shaft and imparting its rotational movements to said first shaft by means of a worm gear.

3. The combination of claim 2 wherein said second shaft carries a pinion meshing with a gear wheel, said gear wheel being fixedly mounted on a third rotatable shaft, said energy-storing means consisting of a spiral spring having one end thereof fixed to a stationary portion of said device and having the other end thereof fixed to said third shaft.

4. A device for controlling the delivery rate of the fuel injection pump of an internal combustion engine as a function of the revolving speed of said engine and of the position of the engine throttle valve, comprising a substantially cylindrical cam member having a surface shaped three-dimensionally in accordance with an empirical law related to said function, means mounting said cam member for both axial and rotational movement, means for controlling axial movement of said cam member comprising a mechanical linkage disposed between said cam member and said throttle valve, means for controlling rotational movement of said cam member comprising a rotor mounted for rotation at a speed proportional to the speed of said engine, an armature coupled to said cam and mounted adjacent said rotor in spaced relation thereto, said armature including a permanent magnet for producing a magnetic field between said armature and rotor whereby said armature is magnetically rotated with rotation of said rotor, and a cam follower adjacent the surface of said cam for controlling the delivery rate of said fuel injection pump, the position of said cam follower being varied in response to changes in the axial and rotational movement of said cam.

5. The combination of claim 4 including spring means attached to said armature for opposing rotation of said armature during rotation of said rotor, whereby said armature assumes an angular equilibrium position during rotation of said rotor which equilibrium position is related to the speed of said engine.

6. A device for controlling the delivery rate of the fuel injection pump of an internal combustion engine comprising a rotor attached to said engine and rotating at a speed proportional to the speed of said engine, an armature mounted for rotation adjacent said rotor, means producing a magnetic field between said rotor and armature whereby said rotor imposes a magnetic rotational torque on said armature related to the speed of said engine, means attached to said armature for resiliently opposing said rotational torque whereby said armature assumes an angular equilibrium position related to the speed of said engine, a substantially cylindrical cam having a three-dimensionally shaped surface, said cam being mounted for both rotational and axial movement, means responsive to the angular equilibrium position of said armature for controlling the rotational position of said cam, means responsive to the air consumption of said engine for controlling the axial position of said cam, and mechanical follower means responsive to both the axial and rotational position of said cam for controlling the delivery rate of said fuel injection pump.

7. The combination of claim 6 wherein said armature includes a substantially cylindrical permanent magnet, said rotor being of hollow cylindrical configuration disposed in surrounding relation to said cylindrical permanent magnet.

References Cited in the file of this patent

UNITED STATES PATENTS

| | | |
|---|---|---|
| 2,193,927 | Jivkovitch | Mar. 19, 1940 |
| 2,378,036 | Reggio | June 12, 1945 |
| 2,670,724 | Reggio | Mar. 2, 1954 |